United States Patent [19]

Ishida et al.

[11] 4,296,907
[45] Oct. 27, 1981

[54] SUPPORT ASSEMBLY FOR AN EXHAUST SYSTEM OF A MOTOR VEHICLE

[75] Inventors: Takashi Ishida, Yokohama; Mamoru Tanaka, Yokosuka, both of Japan

[73] Assignee: Nissan Motor Company, Limited, Yokohama, Japan

[21] Appl. No.: 88,755

[22] Filed: Oct. 29, 1979

[30] Foreign Application Priority Data

Nov. 14, 1978 [JP] Japan .................. 53-156954[U]

[51] Int. Cl.³ .......................................... F16M 13/00
[52] U.S. Cl. .................................. 248/573; 248/544; 248/610; 248/611; 248/634
[58] Field of Search ............... 248/544, 60, 589, 611, 248/610, 612, 613, 573, 592, 560, 632, 634, 49, 74 A; 181/256, 264

[56] References Cited

U.S. PATENT DOCUMENTS

| | | | |
|---|---|---|---|
| 1,919,484 | 7/1933 | Saurer | 248/544 |
| 1,940,686 | 12/1933 | Lord | 248/611 |
| 2,308,969 | 1/1943 | Riesing | 248/613 |
| 2,324,992 | 7/1943 | Riesing | 248/610 |
| 2,448,281 | 8/1948 | Saurer | 248/610 |
| 3,622,194 | 11/1971 | Bryk | 248/611 |
| 3,942,599 | 3/1976 | Shimada | 248/60 X |
| 3,977,486 | 8/1976 | Kleinschmit | 248/610 |

FOREIGN PATENT DOCUMENTS

| | | | |
|---|---|---|---|
| 603657 | 8/1960 | Canada | 248/611 |
| 513664 | 10/1939 | United Kingdom . | |
| 553793 | 7/1943 | United Kingdom . | |
| 564004 | 9/1944 | United Kingdom . | |
| 578061 | 6/1946 | United Kingdom . | |
| 639366 | 6/1950 | United Kingdom . | |
| 661104 | 11/1951 | United Kingdom . | |
| 732177 | 6/1955 | United Kingdom . | |
| 1081916 | 9/1967 | United Kingdom . | |
| 1154645 | 6/1969 | United Kingdom . | |
| 1295986 | 11/1972 | United Kingdom . | |

*Primary Examiner*—James T. McCall

[57] ABSTRACT

A support assembly for an exhaust system of a motor vehicle is disclosed. This assembly comprises a U-shaped channel bracket adapted to be mounted on the body of the vehicle. A strip bracket is adapted to be fixed at one end portion to the exhaust system and inserted at its other end portion parallel to and between the opposite side walls of the U-shaped channel bracket so as to form two spaces between the other end portion of the strip bracket and each of the side walls of the U-shaped channel bracket. Two vibration absorbing members are inserted into the spaces, respectively, and firmly joined to the side walls of the U-shaped channel bracket and the other end portion of the strip bracket to prevent the transmission of vibration of the exhaust system to the vehicle body. There is a spacing between the other end portion of the strip bracket and the bottom of the U-shaped channel bracket thereby preventing the transmission of vertical vibrations from the strip bracket to the U-shaped channel bracket.

2 Claims, 5 Drawing Figures

SUPPORT ASSEMBLY FOR AN EXHAUST SYSTEM OF A MOTOR VEHICLE

BACKGROUND OF THE INVENTION

The present invention relates to a support assembly for an exhaust system of a motor vehicle.

A conventional support assembly, such as designated generally by 20, in FIG. 1 of the accompanying drawings, includes a strip bracket 22 bolted at one end portion 22a to the frame 24 of the vehicle body, an arcuate strip bracket 26 fixed at one end portion 26a by a bolt 28 to a clamp 30 fitted over an exhaust pipe 32 of the exhaust system and a vibration absorbing member 34 through which the two brackets are joined by means of adhesive to each other thereby preventing the transmission of vibration from the exhaust pipe 32 to the bracket 22 through the bracket 26. When the body of the motor vehicle and therefore the exhaust pipe 32 vibrate vertically and laterally, the vibration absorbing member 34 suffers not only a shearing load but also a bending and/or twisting load, and, as a result, the vibration absorbing member 34 can become detached from the brackets, or broken, in which case the exhaust system can fall on the road and cause extreme inconvenience if not an accident.

SUMMARY OF THE INVENTION

It is therefore an object of the present invention to provide a support assembly for an exhaust system of a motor vehicle which increases the durability of a vibration absorbing member interposed between brackets fixed to the vehicle body and the exhaust system, thereby preventing the vibration absorbing member from becoming detached and allowing the exhaust system to fall off.

Another object of the present invention is to provide a support assembly for an exhaust system of a motor vehicle which improves the absorption of vibration which would otherwise be transmitted from the exhaust system to the vehicle body.

According to the present invention, there is provided a support assembly for an exhaust system of a motor vehicle, comprising: (a) a first bracket adapted to be mounted to the body of the motor vehicle and provided with two substantially parallel spaced side walls; (b) a second bracket of substantially strip construction adapted for mounting at one end portion to the exhaust system and inserted at a second end portion between and substantially parallel to the two side walls of the first bracket so as to form two spaces between the second end portion of the second bracket and each of the two side walls of the first bracket; and (c) two vibration absorbing members being respectively inserted into the two spaces, the two members being respectively joined firmly to the second end portion of the second bracket and the two parallel side walls of the first bracket to absorb lateral and vertical vibrations of the second bracket.

These and other objects, advantages and features of the present invention will be apparent from the following detailed description of a preferred embodiment and a modification thereof, with reference to the appended drawings.

DETAILED DESCRIPTION OF THE PREFERRED EMBODIMENTS

Figure 1:
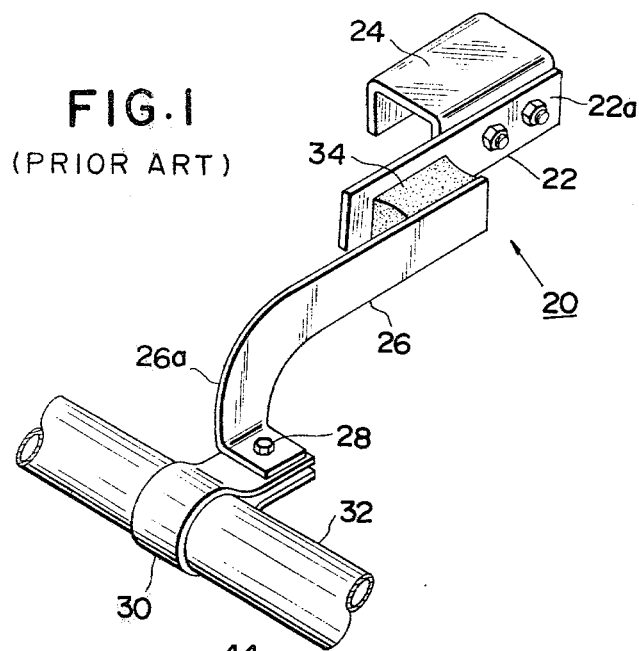
FIG. 1 is a perspective view of a prior art assembly for supporting an exhaust pipe of a motor vehicle.

Throughout the drawings, the same reference numeral designates corresponding parts and so the description thereof will not be repeated.

Figure 2:
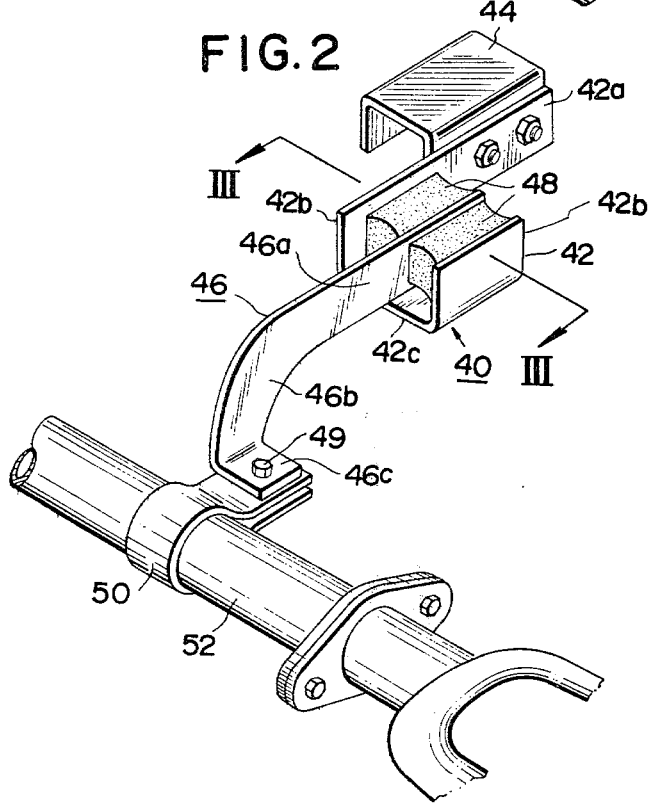
FIG. 2 is a perspective view of a preferred embodiment of an assembly for supporting an exhaust pipe of a motor vehicle according to the present invention.
Figure 3:
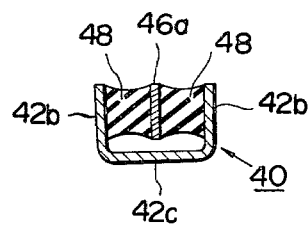
FIG. 3 is a cross-sectional view taken along the line III—III in FIG. 2.

Referring to FIGS. 2 and 3, there is shown a preferred embodiment of the assembly for supporting an exhaust system of a motor vehicle according to the present invention, designated generally by reference numeral 40. This support assembly includes a bracket of U-shaped channel 42 which is bolted at a side wall extension portion 42a to a convenient member 44 of the vehicle body. A strip bracket 46 has its upper end portion 46a positioned between and parallel to the side walls 42b of the U-shaped channel 42 to leave spaces separating the upper end portion 46a from both side walls 42b and from the bottom 42c of the U-shaped channel bracket 42.

Two vibration absorbing members 48 are located in the spaces between the bracket 46 and the side walls 42b and are joined firmly by vulcanised bonding or the like to the side walls 42b and the upper end portion 46a. The lower end portion 46b of the bracket 46 is arc-shaped and has a bent portion 46c which is fixed by a bolt 49 to a clamp 50 fitted over an exhaust pipe 52. Thus, according to this support assembly, vertical and lateral vibrations of the exhaust pipe 52 cause shear deformation of the vibration absorbing members 48 thereby preventing the transmission of vibrations of the exhaust pipe 52 to the vehicle body. Further, although vibrations of the bracket 46 may cause bending or twisting forces in the vibration absorbing member 48, they will be sufficiently suppressed because the bracket 46 is held between the two vibration absorbing members, thereby allowing no excessive stress in the vibration absorbing members.

Figure 4:
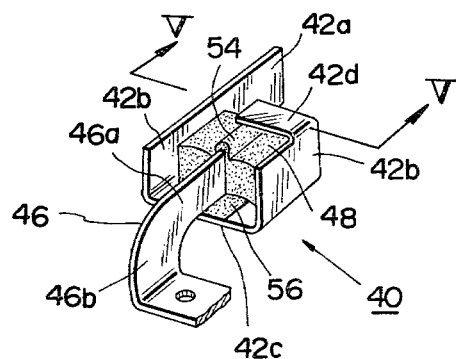
FIG. 4 is a perspective view of a modification of the support assembly according to the present invention.
Figure 5:
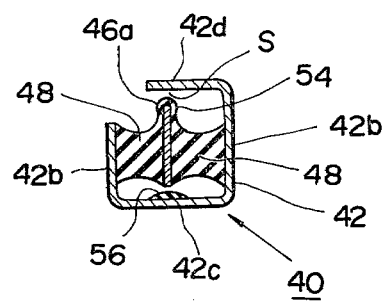
FIG. 5 is a cross-sectional view taken along the line V—V in FIG. 4.

FIGS. 4 and 5 show a modification of the present invention. In this particular modification, a U-shaped channel bracket 42 includes a stop 42d projecting from the top of the end of one side wall 42b toward the opposite end of the other side wall over the end portion 46a of the bracket 46 so as to leave a space S between the stop 42d and the end portion 46a. Vibration absorbing members 54 and 56 are fixed to the upper edge of the upper end portion 46a of the bracket 46 and to part of the bottom 42c of the U-shaped channel bracket 42 facing the lower edge of the end portion 46a in order to absorb vertical vibration energy of the bracket. Alternatively, vibration absorbing member 54 may instead be fixed to a part of the stop 42d facing the upper edge of the end portion 46a of the bracket 46 and the vibration absorbing member 56 may be provided on the lower edge of the upper end portion 46a. Of course, all sorts of other minor modifications of the arrangement of these vibration absorbing members will be obvious to those skilled in the art, and include partial provision of the configurations described above and the integral forming of the vibration absorbing members 54 and 56 with the vibration absorbing member 48.

According to this modification the bracket 46 is prevented from moving vertically beyond the space between the stop 42d and the bottom 42c of the U-shaped channel bracket 42 while the vibration energy of the bracket 46 is absorbed by the vibration absorbing members 54 and 56. Consequently, the exhaust pipe 52 is reliably prevented from being detached by large repeated vibrations thereby improving the durability of the support assembly.

This modification is constructed in such a way that even in the extremely unlikely event that the vibration absorbing members 48 supporting the bracket 46 should disintegrate to the point of no longer supporting the bracket 46, the exhaust pipe system can still not fall from the vehicle. Instead, the bracket 46 will be retained and supported by the U-shaped channel bracket 42. In this event, undoubtedly the exhaust system will rattle loudly, and immediately alert the driver, but it will not fall into the road and form a traffic hazard.

The preferred embodiment and modification of the present invention has been described in detail with reference to the appended drawings, but the present invention is not to be read as limiting its scope, which rather is to be defined by the attached claims. Other various modifications, which are still within the scope of the present invention, will be clear to those skilled in the art.

What is claimed is:

1. A support assembly for an exhaust system of a motor vehicle, comprising:
   (a) a first U-shaped bracket adapted to be mounted at one side to the body of the motor vehicle and provided with two substantially parallel spaced side walls in such a manner that the open side of said U-shaped bracket faces upwardly;
   (b) a second bracket of substantially strip construction adapted for mounting at one end portion to the exhaust system and inserted at a second end portion between, and substantially parallel to, the two side walls of said U-shaped bracket in such a manner that the surface of said strip is normal to the bottom surface of the U-shaped bracket so as to form two spaces between the second end portion of the second bracket and each of the two side walls of the first bracket;
   (c) two vibration absorbing members being inserted into the two spaces, the two members being respectively joined firmly to the second end portion of the second bracket and the two parallel side walls of the first bracket to absorb lateral and vertical vibrations of the second bracket;
   (d) a stop extending from an upper portion of one of said two side walls toward the other side wall so as to prevent the movement of the second end portion of the second bracket beyond the stop; and
   (e) a third vibration absorbing member disposed on one of the facing surfaces of said stop and said second end portion of said second bracket in such a manner that there is an appropriate spacing between the third vibration absorbing member and the other of said stop and said second end portion of said second bracket.

2. The support assembly of claim 1, further including a fourth vibration absorbing member disposed on one of the facing surfaces of said second end portion of said second bracket and said bottom of said first bracket in such a manner that there is an appropriate spacing between the fourth vibration absorbing member and the other of said second end portion of said second bracket and said bottom of said first bracket.

* * * * *